United States Patent [19]

McTaggart

[11] Patent Number: 5,417,575

[45] Date of Patent: May 23, 1995

[54] ELECTRONIC BOOK

[76] Inventor: Stephen I. McTaggart, 6031 E. Mescal St., Scottsdale, Ariz. 85254

[21] Appl. No.: 137,063

[22] PCT Filed: Apr. 14, 1992

[86] PCT No.: PCT/US92/03056

§ 371 Date: Oct. 15, 1993

§ 102(e) Date: Oct. 28, 1993

[87] PCT Pub. No.: WO92/18964

PCT Pub. Date: Oct. 29, 1992

Related U.S. Application Data

[63] Continuation-in-part of Ser. No. 685,278, Apr. 15, 1991, Pat. No. 5,167,508, which is a continuation-in-part of Ser. No. 396,129, Aug. 21, 1989, abandoned.

[51] Int. Cl.⁶ ............................................. G09B 5/00
[52] U.S. Cl. ................................... 434/317; 434/308
[58] Field of Search ............... 434/308, 309, 311, 317, 434/156, 178, 179, 169; 40/455, 906

[56] References Cited

U.S. PATENT DOCUMENTS

| | | | |
|---|---|---|---|
| 4,363,081 | 12/1982 | Wilbur | 434/317 X |
| 4,809,246 | 2/1989 | Jeng | 434/317 |
| 4,990,092 | 2/1991 | Cummings | 434/317 |
| 5,209,665 | 5/1993 | Billings et al. | 434/169 |
| 5,290,190 | 3/1994 | McClanahan | 434/317 |

Primary Examiner—Richard J. Apley
Assistant Examiner—Glenn E. Richman
Attorney, Agent, or Firm—Meyer Hendricks Victor Osborn & Maledon

[57] ABSTRACT

An electronic book apparatus that comprises multiple pages (122) with printed information (126), a visual signal (125) for identifying the printed information in a sequentially organized manner, a synchronized audio signal (154) for describing and further identifying the information concurrently with the visual signal, and a switch (127) for electronically controlling the generation and transmission of these signals when each particular page is opened for viewing. Each page of the electronic book includes a laminated sheet (124), on which the printed material is arranged, and an electronic backdrop (121) containing the visual signal for display through the laminated sheet. Separate intelligent electronics (160) in the spine (140) and top portion (150) of the book, coupled to the a switch, activate the illuminating circuitry and a voice synthesizer (168) that are synchronized and sequenced to produce a concurrent visual and audio enhancement of the printed matter being viewed on the page.

38 Claims, 6 Drawing Sheets

ELECTRONIC BOOK

RELATED APPLICATIONS

This application is a continuation-in-part of U.S. application Ser. No. 07/685,278 filed by the same inventor on Apr. 15, 1991, patented, U.S. Pat. No. 5,167,508, which is a continuation-in-part of U.S. application Ser. No. 07/396,129, filed by the same inventor on Aug. 21, 1989, now abandoned.

BACKGROUND OF THE INVENTION

1. Field of the Invention

This invention relates to the general field of apparatus and methods for combining audio and visual signals for displaying information. Specifically, the present invention relates to apparatus and methods for enhancing the comprehension and retention of information displayed in a book by combining visual and audio messages with the presentation of printed material.

2. Description of the Prior Art

Comprehension of printed matter is a high-priority educational objective of modern society. It is known that comprehension of all printed material depends on the viewer's ability to interpret visually perceivable information in accordance with previously acquired knowledge associated with that information. Accordingly, various attempts have been made at producing aids to enhance the process of interpretation of such visually perceived information in order to improve its comprehension and assimilation.

Among the various devices found in prior art, U.S. Pat. No. 4,021,932 to Lipps (1977), U.S. Pat. No. 4,189,852 to Chatlien (1980), U.S. Pat. No. 4,273,538 to Ross (1981), U.S. Pat. No. 4,425,098 to Doring (1984), U.S. Pat. No. 4,752,230 to Shimizu (1988), U.S. Pat. No. 4,778,391 to Weiner (1988), and U.S. Pat. No. 4,809,246 to Jeng (1989) disclose several approaches utilized to provide effective highlighting of printed material, either for amusement purposes or for improving the comprehension and retention of a reader. U.S. Pat. No. 4,809,246, in particular, teaches a sound-illustrated book that utilizes a page sensing element that triggers an audio recording of a description of the printed matter on the page being viewed.

In U.S. Pat. No. 4,703,573 (1987), Montgomery et al. disclose an electronic book apparatus with audio and visual components for electronically generating and transmitting a combination of sound and electronic images to identify the information displayed on an open sheet. Control circuitry is provided on the sheet to coordinate the functioning of the audio and visual displays according to a predetermined sequence considered appropriate to enhance understanding of the material. Similarly, U.S. Pat. No. 4,363,081 to Wilbur (1982) describes the use of light emitting diode (LED) components to highlight drawings and other printed matter in greeting cards.

In addition, U.S. Pat. No. 4,209,824 to Kauffman (1980) discloses a book comprising pages including electrical circuitry and apertures with light emitting devices in each page to illuminate areas of pictures printed on the page. U.S. Pat. No. 3,592,098 to Zadig (1971) teaches a flexible conductive ink which enables the sheet on which the ink is printed to be folded across the ink without breaking the ink circuit. In U.S. Pat. Nos. 1,545,217 (1925) and 1,670,254 (1928), Thurber and Gowin show the forming of conventional, non-electronic, books by folding a single sheet in accordion style. Finally, U.S. Pat. Nos. 2,277,318 (1942) and 2,444,355 (1948) to Grant and Kniznick illustrate the making of conventional books by folding a plurality of sheets in half and binding them at the folds to the spine of the book.

A review of the prior art shows that most devices developed to date merely present an audio description or lighting of printed matter illustrated on a page. Others appear to limit the audio and/or visual enhancement to just printed words or printed images. Most importantly, though, the various kinds of apparatus used in prior art are not practical for bound book format because of the space requirements associated with the use of LED's or of conventional illumination devices, such as liquid crystal displays (LCD's), for providing the required visual enhancement. Moreover, the approaches taught in prior art to control the functioning of both the audio and the visual displays are specific to the requirements of each page; therefore, they are not suitable for voluminous multipage applications because of the excessive space requirements associated with running duplicate parallel circuitry from each page to a central control board through the book spine. Finally, no existing electronic book utilizes visual and audio messages in interactive fashion with the reader to illustrate the printed material.

Therefore, there still exists a need for practical apparatus wherein visual information, presented in any character or image form on a page of a book (hereinafter referred to generally as printed matter, material, or information), is explained, highlighted, or in any way enhanced by sound and light displays systematically synchronized with the information to stress its meaning and improve comprehension and retention on the part of a reader. In particular, there is a need for a compact method of manufacturing that is suitable for assembling many pages into a single bound book in an economical and practical manner.

SUMMARY OF THE INVENTION

In view of the foregoing, the primary objective of this invention is to provide an electronic book apparatus that produces visual and audio enhancement of printed information.

Another objective of the invention is to provide an electronic book apparatus that produces visual signals in conjunction with the display of the printed information in the book in order to highlight and draw attention to it.

A further goal of the invention is to provide an electronic book apparatus that also produces an audio signal, or message, in conjunction with the display of the printed information in the book in order to describe and facilitate the reader's recognition and understanding of the material and to further highlight its presence on a page.

Another goal of the invention is to provide synchronization between the audio and visual signals in connection with any portion of the printed information to which they pertain, so as to clearly focus the attention of the viewer on the particular portion of interest and improve his or her comprehension of the material viewed.

Still another objective is the sequential delivery of the synchronized audio and visual messages according to a predetermined schedule appropriately chosen for educational or entertainment purposes.

A related object of the invention is an interactive system whereby the reader of the book can chose between alternatives to best suit his or her interest, so that the reader's attention can be further stimulated by direct involvement in the viewing progression through the material in the book.

A further objective of the invention is the ability to apply the same general concept in a variety of designs and physical embodiments to fit different implementation formats, as may be desired for different kinds of printed information. To that end, the apparatus described herein can be implemented in modular form, wherein each page of a book constitutes a modular component of the overall apparatus.

A further goal of the invention is an apparatus that is suitable for assembly in voluminous form and wherein the visual and audio display of each page can be controlled directly from a central control board and independently of the other pages.

Yet another objective of this invention is the realization of the above mentioned goals in an economical and commercially viable manner. This is done by utilizing simple components and methods of manufacture that are either already available in the open market or can be developed at competitive prices.

In accordance with these and other objectives, one embodiment of the present invention provides an electronic book apparatus that comprises multiple pages with printed information, visual signal means for identifying the printed information in a sequentially organized manner, synchronized audio signal means for describing or further identifying the information concurrently with the visual signal means, and electrical or photo-sensitive means for electronically controlling the generation and transmission of these signals when each particular page is opened for viewing. Each page of the electronic book includes a laminated sheet, on which the printed material is arranged, and an electronic backdrop containing the visual signal means for display through the laminated sheet. Circuitry in the spine of the book couples the electronic backdrop of each page, including the electrical or photo-sensitive control means, to separate intelligent electronic means for activating the illuminating circuitry and a voice synthesizer that are synchronized and sequenced to produce a concurrent visual and audio enhancement of the printed matter being viewed on the page. The apparatus controls the presentation in a predetermined sequence deemed appropriate to enhance comprehension of the material and, if desired, provide entertainment. In the preferred embodiment of the invention, the user is provided at each page with alternative options to repeat certain sequences or continue through the book.

Various other purposes and advantages of the invention will become clear from its description in the specifications that follow, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only one of the various ways in which the invention may be practiced.

DETAILED DESCRIPTION OF THE INVENTION

The heart of this invention lies in the novel method of manufacture of an electronic book that permits the combination of visual and audible signal circuitry in compact format for use in voluminous publications. In one embodiment, the book consists of a continuous sheet of circuitry folded in accordion fashion and bound at one end to form leaves and corresponding pages. In the preferred embodiment, the circuitry corresponding to each pair of facing pages (spread) or, in the alternative, to each book leaf (opposite pages on one sheet) constitutes a module that is made functional by connection with control electronics in the head portion of the book through flexible printed circuitry in the spine of the book.

Figure 1:
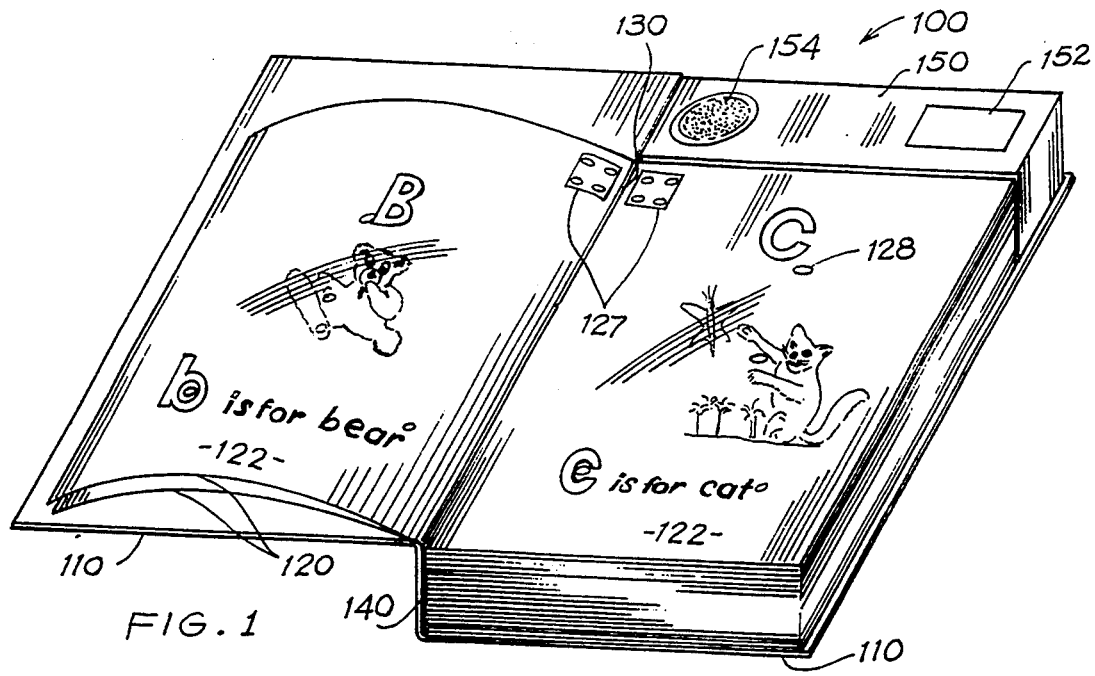
FIG. 1 is a perspective view of the general features of an embodiment of the present invention showing the general configuration of the electronic book and illustrating an open spread with alphabet letters and pictorial representations of related subject matter.
Figure 2:
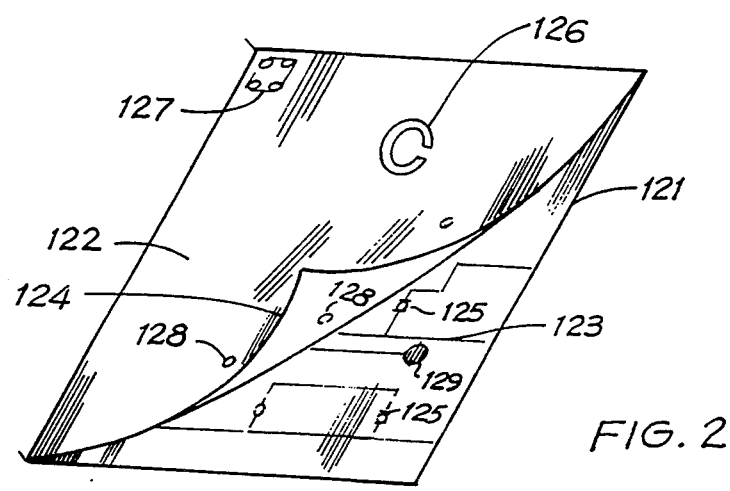
FIG. 2 illustrates the laminated construction of a book page exposing a circuit board layer sandwiched between a top sheet bearing visual information and a bottom support sheet.

Referring now to the drawings, wherein like parts are designated throughout with like numerals and symbols, FIG. 1 illustrates the general features of an embodiment of an electronic book 100 according to the present invention. The book comprises a cover 110 for covering and binding a multiplicity of laminated leaves 120 bound at the inside margin 130 to form a spine 140. The cover 110 includes a head portion 150 that incorporates the electronic control circuitry (intelligent electronic circuitry) of the book (not shown in FIG. 1), a battery compartment 152, and a speaker 154. Each page 122 of the book 100 consists of a laminated assembly, as illustrated in FIG. 2. A top sheet 124 in the laminated assembly bears visual information 126 in the form of printed images, alphabetical characters or other material suitable for affixation to a book page. A bottom or core sheet 121 bears a circuit board layer 123 attached to the face of the sheet itself and including light emitting diodes (LED's) 125 corresponding to either translucent portions or apertures 128 in the top sheet 124 for visual accessibility when the page 122 is assembled in its laminated form.

Although obviously not visible in the figure, the page on the back side of FIG. 2 consists of the same structural components and also has a two-sheet laminated configuration, with a top sheet bearing printed information and a bottom sheet, normally the other side of the same core sheet forming the opposite page, bearing a corresponding circuit board layer.

Figure 3:
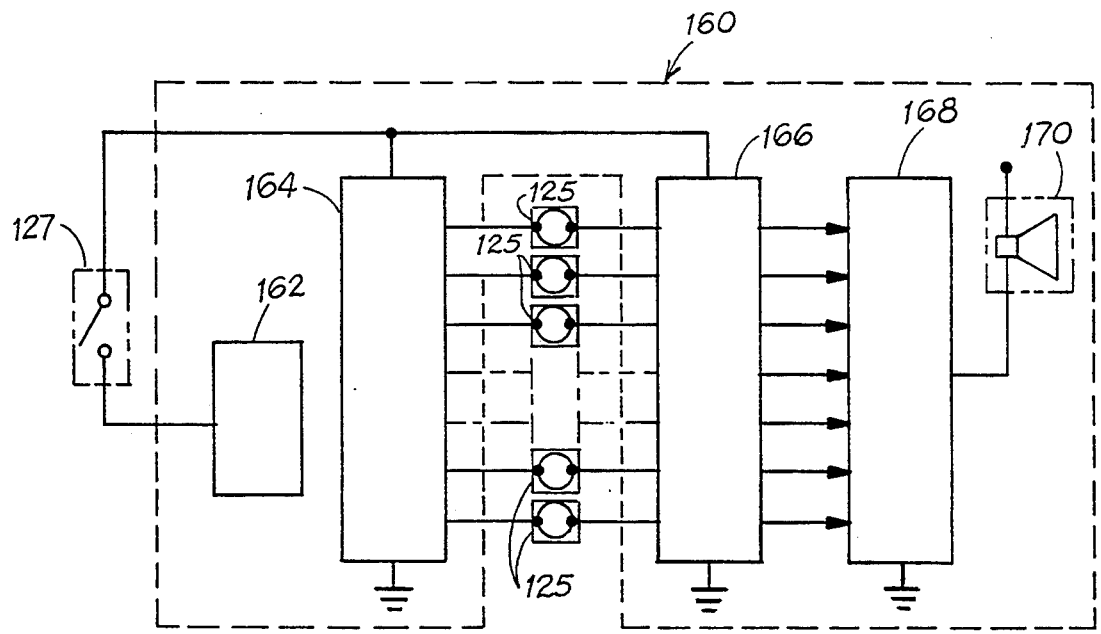
FIG. 3 is a block diagram illustrating the electronic components of the intelligent circuitry of the book of the invention.

As explained in detail in the referenced copending applications and in several prior art patents, the circuit board layer 123 is provided with electromechanical contact switch elements 127 that extend through the top sheet 124 to initiate the operation of the electronic book 100 when the book is opened to the corresponding page. Equivalent pressure or photo-sensitive switch elements could be used to perform the same function, thus activating the switch by applying pressure or by exposing it to light upon opening of the book, respectively. The switch element 127 on the page electronically generates and transmits an identifying signal (such as an open or a closed circuit signal) through that page's circuit board layer 123 to the separate electronic circuitry 160 stored in the head portion 150 of the book. As shown in block form in FIG. 3, this circuitry comprises a power source 162 (provided in the form of a battery stored in compartment 152 of the book) which, through the switch elements 127 in each page, energizes sequencer means 164, synchronizer means 166, and voice synthesizer means 168 coupled to audio means 170, which normally consists of a speaker 154 (illustrated in FIG. 1). The power source 162 and the audio means 170 are preferably packaged inconspicuously in the head portion 150 of the book and are electrically coupled to the electronic circuitry 160 and to the circuit board layer 123 of each page through appropriate interconnecting circuitry described below. The audio means 170 may consist of headphones (also not shown) for personal private listening while viewing the material contained in the book.

In operation, using contact switch elements for example, whenever the book 100 is opened between two adjacent pages of a spread, as illustrated in FIG. 1, the contact between the switch elements 127 on the two adjacent pages is automatically interrupted, sending a signal to the electronic circuitry 160 that activates its control function to begin a sequence of visual and audible signals associated with the material presented on the left page of that spread. The activating switch elements 127 may function strictly by contact, as illustrated by the switch elements on the opposite pages of FIG. 1, so that an open circuit is created by separating the pages and separating adjacent components that otherwise form a normally-closed switch assembly. On the other hand, each switch element 127 could consist of a spring-loaded or of a pressure sensitive switching device triggered by the opening of the book at the corresponding page; or it could consist of a photo-electric element responsive to the light received when the book is opened (this embodiment, of course, would not work in the dark). As illustrated in the preferred embodiment described below, each switch element 127 may simply consist of a pressure switch incorporated in the circuitry of each page and manually operated by the viewer to activate the audio and visual functions of that page. On the other hand, when the activation is achieved automatically by opening the book at any point, thus exposing the content of a spread of adjacent pages, the activation of the pair of switch elements 127 on such adjacent pages first triggers the operation of the circuitry on the left page. The sequencer 164 and synchronizer 166 cause the identification and highlighting of selected portions of the printed matter 126 on that page by means of corresponding LED's 125 situated next to that matter; concurrently, they cause the delivery of voice messages for further identification and interpretation of the printed matter through the voice synthesizer 168 and the audio means 170, all in accordance with a predetermined order and interval of presentation programmed in the electronic circuitry 160. The layout of the circuit board layer 123 corresponding to the activated left page determines the exact physical location on the page of the visual signals produced by the LED's and visible through the translucent portions or apertures 128 in the top sheet 124 of that page. Of course, these locations may be the same or vary from page to page according to the specific requirements for the material being displayed. In fact, the sequencer and synchronizer can be programmed through micro-chip integrated circuitry, according to methods well known in the art of integrated circuitry, to perform any sequence of visual and audio signal combinations in a manner tailored to produce maximum enhancement of the material presented. In addition, the programmed display may include interactive alternative or repetitive sequences for the viewer's choice, to be implemented by pressure switches 129 incorporated into the circuit board layer 123 of each page. Thus, for instance, at a certain point in the sequence of signal delivery, an audible message would inform the reader of alternative progression choices in response to specific instructions communicated by the reader through the pressure switch 129 (which, in turn, could correspond to a recognizable feature in the displayed printed material). For example, after a series of light and sound signals associated with the display of the printed image of a bear on the page, a message would be heard instructing the viewer to press the bear's nose once to repeat, twice to play a game, or not at all to continue to the next page. The game could consist of any light and sound combination of signals deemed appropriate for the desired purposes and any level of interaction could be designed into the programmed sequence by requiring appropriate responses through additional pressure switches 129 similarly located to correspond to points of interest throughout the page. These various alternatives are matters of design choices concerning the audio and visual content of each book. Their implementation is a matter of programming electronic circuitry designed for the specific desired purpose, according to methods and apparatus that are well known in the art of speech synthesis and sequential light emission and that are not within the inventive scope of this specification. Therefore, the details of such implementation are not addressed here.

When the logic of possibilities on the left page is exhausted, as determined by the specific program designed for the book, the sequencer 164 automatically starts a similar series of audible and visual signals for the adjacent right page in conjunction with the presentation of its printed material. The sequence of signals for each page may be the same or different, depending on the preprogrammed instructions, but it always contains light and sound signals designed to maximize the reader's understanding and retention of the printed material. At the conclusion of the sequence for the right page, the apparatus stops (unless forced to repeat by the reader in response to an available option, as described above for the left page) until a new pair of switch elements 127 is activated by the opening of the book at another page.

While audio and visual displays similar to the one described above are known in the art, the method and apparatus of the present invention are particularly suitable for multi-leaf compilation. The approach used here utilizes novel methods for connecting the circuit board layer 123 of each page to the intelligent electronic circuitry 160, which results in a more compact design and added versatility. A novel approach is also utilized in placing LED's in the circuit board layer of each page in a way that reduces manufacturing costs and minimizes the space between pages occupied by the LED's.

Figure 4:
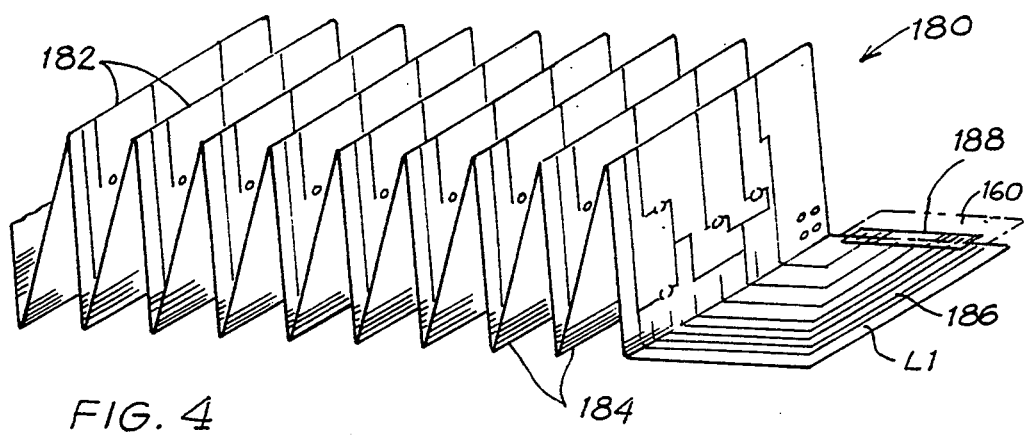
FIG. 4 is a perspective view of a continuous core sheet used to form the leaves of the electronic book according to one embodiment of the invention.
Figure 5:
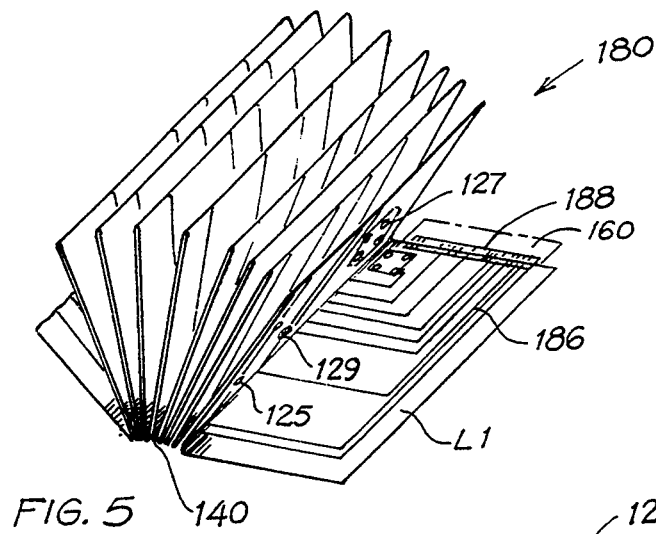
FIG. 5 is a perspective view of the continuous core sheet of FIG. 4 after assembly into book-leaf form.

As illustrated in FIG. 4 for the first embodiment of the invention, a continuous circuit board layer 186 for the entire book is printed on one side (the top side in FIG. 4) of a continuous core sheet 180 by means of flexible conductive ink. The core sheet 180 is then folded into equal segments in accordion fashion to form book leaves consisting of pairs of adjacent segments, of which the inside folds 184 are bound to constitute the book's spine 140, while the outside folds 182 constitute the outer edges of the book's pages. FIG. 5 illustrates the way the continuous sheet 180 is assembled into book-leaf form. As seen in both FIGS. 4 and 5, a terminal board 188 is provided to connect the circuit board layer 186, which passes through the last segment L1 of the core sheet 180, to the intelligent electronic circuitry 160 housed in the head portion 150 of the book's cover. The function of the terminal board 188 is to provide a convenient point of connection with the multi-terminal circuitry 160, whether by direct connection with electronic devices in the circuitry or by connection with a master board (not shown in the figures) containing such devices and having terminal leads for connection with the terminal board 188. LED's 125, contact or photosensitive switches 127, and pressure switches 129 are incorporated into the continuous circuit board layer 186 in the same manner as in the individual page application described in FIG. 2; that is, the circuitry of each page is independently connected to the electronic circuitry 160 by separate conductive paths that run all the way from the particular page to last segment L1 through the entire portion of the core sheet in between. The last segment L1 is then connected to electronic circuitry 160 via the terminal board 188.

Finally, each page formed by folding the continuous core 180 as an accordion is laminated with matching printed material with translucent portions or apertures 128 corresponding to each LED in the circuit board layer of the book. Thus, the circuit board layer 186 is covered throughout the book by sheets 124 containing printed material and translucent portions or apertures 128 for each underlying LED. Obviously, the continuous core 180 must be made of nonconductive material capable of accepting flexible conductive ink, as taught in the prior art. Any material suitable for making book leaves, such as paper or thin plastic, which can be folded without breakage, is acceptable. Typically, the fold lines are provided through what is referred to in the art of book-making as "living-hinge" technology, which involves the formation of a hinge line by scoring it or compressing it onto the material constituting the leaf of the book. The material used may vary from pure paper to pure synthetic substances, including a variety of composite materials. For example, the products sold by Paper Sources International under the trademark "Chromolux" and by the Champion International Corporation under the trademark "Cromekote" consist of paper coated on both sides with a layer of synthetic material, available in overall thicknesses from approximately 6 to 18 thousands of an inch. The product marketed by the Kimberly-Clark Corporation under the trademark "Kimdura" consists entirely of synthetic paper, a polypropylene material, available in thicknesses ranging from about 3 to 12 thousands of an inch. The materials marketed by the Spring Hill Paper Company under the trademark "Claycoat" and by the ICI Company of England under the trademark "Melinex" consist of a polyester substrate. These materials are all suitable to practice the invention and can all be folded for long-term durability by means of living hinges.

In a second embodiment of the invention, an equivalent configuration not shown in the figures, the circuit board layer 186 is printed on the back side of the continuous core sheet 180, so that it lays entirely on the back, instead of the front, of each core segment corresponding to a page. In that case, the circuitry becomes sandwiched between pages in the interior of each leaf and, as a result, the LED's are not directly accessible from the front side, which is where the top sheet with printed material is laminated onto the core sheet. Therefore, it is necessary to provide perforations in the core sheet corresponding to each LED, so that it becomes visible through the core sheet and, consequently, through the top sheet carrying printed information. Since this configuration causes adjacent portions of the circuit board layer to be in direct contact with one another because sandwiched between segments of the board, it is also necessary to protect the circuit board layer by coating it with a layer of flexible dielectric paint, such as the product marketed by Olin Hunt Specialty Products Inc., a subsidiary of the Olin Corporation of Ontario, California, under the name "37AC22 UV Curable Spacer" or equivalent insulating material.

The circuit elements of the sequencer 164 and synchronizer 166 are well known commercially available components and, therefore, are not herein described in detail. For example, three 16-to-1 analog multiplexers, such as sold by the Motorola Corporation of Chicago, Ill., are perfectly suitable to provide the sequencer and synchronizer functions required to practice the invention. Note that the sequencing and synchronous control functions may be included in a single integrated microprocessor, according to techniques that are also well known and within the skills of an artisan in the trade. Similarly, the voice synthesizer 168 may be one of several available speech synthesizers requiring the use of a microprocessor with a memory for storing the speech code, as well as a memory for storing the control code for displaying the visual signals. In the preferred embodiment of the invention, which is detailed below, the sequencer, synchronizer and synthesizer functions are provided by a Texas Instruments TSP-50C-11 speech synthesizer in combination with a Signetics CD694067 decoder/multiplexer/expansion sequencer, and a 10 MHz synchronization crystal, which are programmed to perform the desired functions as the circuitry of each page is activated according to the packaging described herein.

Commercially available LED's, such as those used in prior art devices that affix LED's to a supporting page, are available in a variety of thicknesses approximately in the 20 to 50 thousands of an inch range. For example, Instruments Design Engineering Associates, Inc. of Brea, Calif., sells an LED approximately 50 thousands of an inch (1.3 mm) thick, which is suitable to practice this invention. A much thinner, and therefore preferable, LED is sold by Citizens Electronic Company of Japan as Part No. CL-190YG-X, believed to be approximately 20 thousands of an inch thick.

Figure 6:
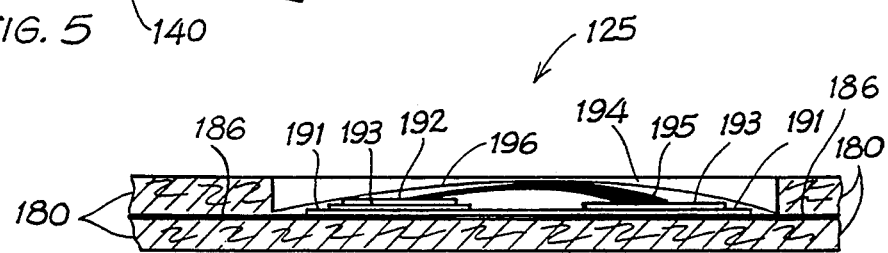
FIG. 6 is a cross-sectional view of a portion of the core sheet of the invention illustrating the construction of a light emitting diode directly on the page of the book.

Another novel characteristic of this invention, suitable for embodiment in any of the configurations adopted for assembling the electronic book, lies in the method of manufacture of the LED structure within the circuit board layer 186, whereby each LED component is formed directly in the core sheet 180 of the book. Instead of mounting commercially available LED's into the network of the circuit, it is found that construction of each LED structure 125 directly into the circuit board layer of each page results in significantly lower manufacturing cost and lower overall thickness of the page. Thus, as illustrated in the greatly enlarged cross-sectional view in FIG. 6 of an LED site within a leaf of the core sheet 180, using techniques similar to well known methods employed for mass production of LED's, a semiconductor die chip 192 is deposited directly into each LED site in the circuit board layer 186 of the continuous core sheet 180. A base is first prepared for each LED by laying a small length of conductive tape 191 across each set of LED terminals in the circuit board layer 186. The tape 191 is adhesive on both sides and laminated on the top side with copper foil 193, appropriately scored in the middle to form two electrically separate copper strips. This kind of conductive adhesive tape is available commercially in a variety of forms produced by the 3M Company of Saint Paul, Minn., such as copper-foil-backed 9703 Transfer Conductive Adhesive. The section of tape used on each LED site is oriented so that each copper strip covers one of the terminals in the circuit board layer 186. The conductivity of tape 191 is directional only, so that a current can flow across but not along the plane of the tape; therefore, the two copper strips 193 are initially electrically insulated from one another, but are connected through the tape 191 to the corresponding circuit board layer terminals on which they lie, thus forming suitable electrodes for integrating the semiconductor die into the circuit board layer. A semiconductor die chip 192 is then placed on the cathode side and electrically connected and bonded to the anode side by a strand of conductive epoxy resin 195 deposited on the anode side and stretched to make contact with the die chip. In practice, this bonding operation is performed simultaneously on multiple die chips on the tape, which is then cut to yield individual LED components. Each component is then affixed with the appropriate electrical orientation to the terminals in the LED sites of the circuit board layer and covered with a sufficient amount of non-conductive epoxy resin 196 to bond it to the core sheet 180 and to the conductive ink of the circuit board layer 186. In addition, the resin 196 covering the site tends to acquire a curvature that forms a lens over the light emitting diode, thus further enhancing its effect in providing visual signals to the reader of the book. As explained above, if the circuit board layer 186 is printed on the back side of the core sheet 180 and each LED is thus constructed on the back side of each segment constituting a page (as illustrated in FIG. 6), a corresponding perforation 194 on the adjacent segment of core sheet (both segments forming a book leaf) is required to make the LED visible from the front side of such adjacent segment. In that case, in order to properly coordinate the functioning of the visual display, the circuitry and the LED's corresponding to each page would have to be placed on the back of the segment of core sheet corresponding to the opposite page (i.e., the back of the adjacent segment). This way, the LED can be seen through the perforation 194 placed on the page to which the LED pertains (i.e., the page on the adjacent segment).

The LED manufacturing industry provides standard equipment that can be used to manufacture the LED's of the invention directly on the circuit board layer, as described above. Kulicke and Soffa Industries, Inc. of Willow Grove, Pa., provide several die bonders, such as the Models 6490 and 6491 Semiautomatic Die Bonders, that have proven suitable for the task. The average combined thickness of the conductive tape 191 and copper foil 193 used in the preferred embodiment of the invention (the 3M 9703 Transfer Conductive Adhesive mentioned above) is approximately 1.4 thousands of an inch; the semiconductor LED die chip 192, a product marketed by Hewlett-Packard, National Semiconductor, and other companies, is less than five thousands of an inch thick, depending on the specific product used; and the conductive strand 195, formed using LED wire bond material as available from Kulicke and Soffa Industries, is also approximately 5-10 thousands of an inch thick, depending on how it is laid. The nonconductive protective resin 196 (also available form Kulicke and Soffa Industries) that is used to cover the assembly of the other parts varies in thickness as needed. Therefore, the overall thickness of an LED so constructed is approximately 10–20 thousands of an inch, even including the arbitrary thickness of the protective lens 196. This constitutes a thickness reduction with respect to most standard LED's, which can reduce the overall thickness of each page and permit the construction of an electronic book containing a large number of pages.

Figure 7:
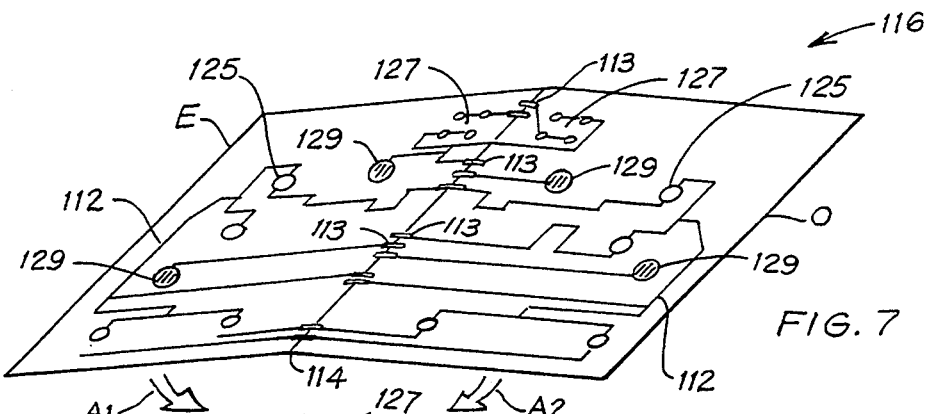
FIG. 7 is a perspective view of a modular core sheet used to form one leaf corresponding to two opposite pages of the electronic book according to another embodiment of the invention.
Figure 8:
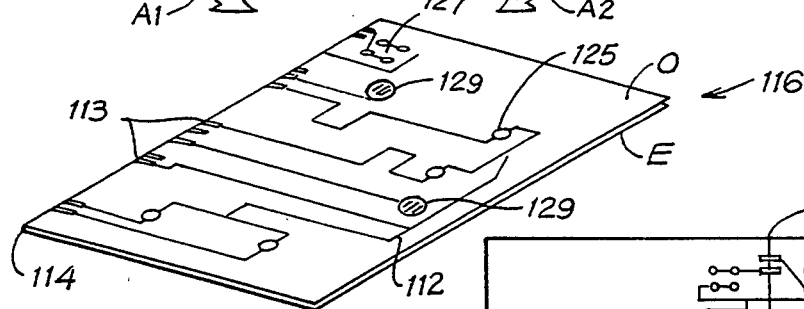
FIG. 8 is a perspective view of the modular core sheet of FIG. 7 after assembly into a modular book leaf.
Figure 9:
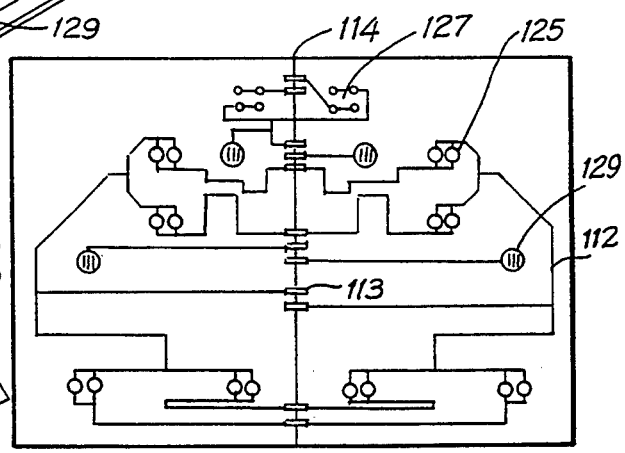
FIG. 9 is a plan view of an example of a circuit board layer printed on the modular core sheet of FIG. 7 showing conductive paths through the center fold for connection, through the spine of the book, to intelligent electronic circuitry housed in the book cover.

In a third embodiment of the invention, the circuit board layer of each page is further simplified by a modular approach to the construction of each book leaf. This approach can also take different configurations depending on whether the circuit board layer is printed on the front or the back side of the core sheet for each page. When printed on the front side, as shown in FIG. 7, each leaf of the book consists of one core sheet 116 corresponding to two opposite pages on the same leaf, referred to in the figure as O and E for odd and even with reference to conventional page numbering. Each core sheet 116 bears a circuit board layer 112 corresponding to the specific display requirements of the two pages O and E, with the same general characteristics described above for the continuous core sheet 180 of FIG. 4. That is, the circuitry of each individual page (containing the LED's 125, the switch element 127, and the pressure switches 129 for that page) is self-contained, independent of the circuitry in any other page, and connected to the separate intelligent electronic circuitry 160 through conductive paths originating in the connections 113 across the center fold 114 of the modular core sheet (which becomes a common edge between the two opposite pages after folding of the core sheet and becomes part of the spine of the book after assembly into book format). Thus, the circuitry of each page is connected to the electronic circuitry 160 in parallel to the circuitry of each other page, and it is controlled directly by the circuitry 160 through separate connecting terminals. By folding each core sheet 116 in two backwards, in the direction of arrows A1 and A2 and along the center fold 114, a book leaf 116 is formed wherein the edge corresponding to the center fold 114 constitutes the inside margin of each opposite page O and E (and the common edge of the folded module), and wherein each page contains the half of the circuit board layer 112 that pertains to its printed material, as illustrated in FIG. 8. By properly positioning the connections 113, which span the fold 114 of the circuit board layer 112, these connections can be used, through corresponding connections 223 in a specially constructed spine 221 of the book (shown in FIG. 10), as the conductive paths to the intelligent electronic circuitry 160 housed in the head portion 150 of the book's cover. An example of one such circuit board layer 112 is shown in FIG. 9, wherein each LED site is shown with two LED's.

Figure 10:
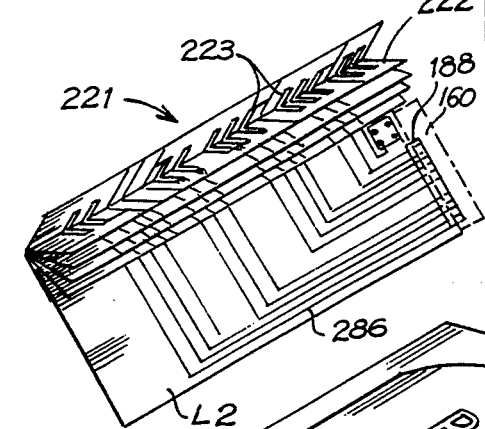
FIG. 10 is a perspective view of a fan-like spine for receiving each modular book leaf, as shown in FIG. 8, between flaps that contain corresponding connections to the control circuitry of the book.
Figure 11:
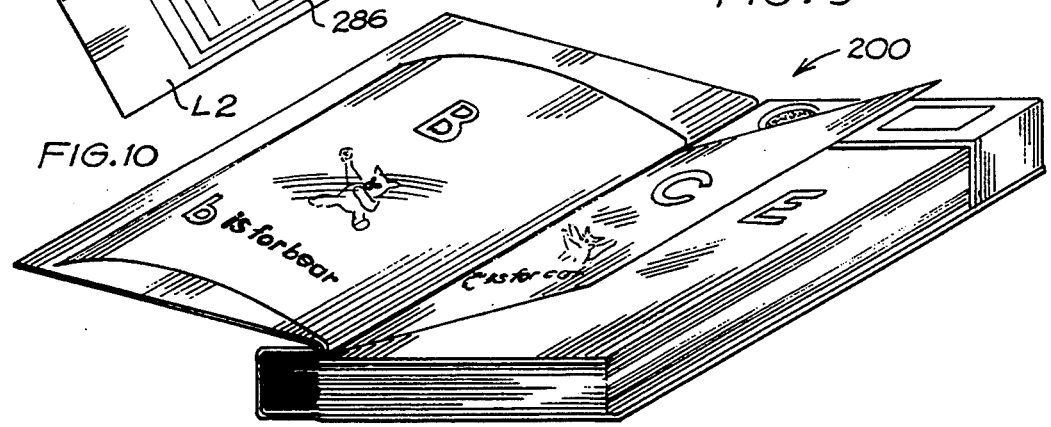
FIG. 11 shows a perspective view of an embodiment of the invention manufactured according to the spine and modular leaf approach illustrated in FIGS. 8 and 10.

As illustrated in FIG. 10, the specially constructed fan-like spine 221 is provided for receiving each book leaf 116 sandwiched between flaps 222 that contain connections 223 configured to correspond and become coupled to the connections 113 of each leaf to form a conductive path to the main brain of the book through a last segment L2 (equivalent to the last segment L1 of the core sheet 180 shown in FIGS. 4 and 5). Like the continuous core sheet 180, the spine 221 is constructed by printing on a single sheet, by means of flexible conductive ink, a continuous circuit board layer 286 converging to the segment L2, which is designed for coupling with the intelligent electronic circuitry 160 housed in the head portion 150 of the book's cover through the terminal board 188. The continuous sheet of the spine 221 is folded (except for the segment L2) into equal narrow segments or flaps 222 in accordion fashion to form the spine 221 shown in FIG. 10. A specific conductive path goes from each connection 223 to the last segment L2 through the accordion-folded spine and there it is routed to a common terminal board 188. Therefore, once inserted into the spine and coupled to the connections 223 between each pair of flaps 222, the connections 113 of each modular book leaf 116 are directly connected to the terminal board 188 (and therefore to the electronic circuitry 160) through the continuous circuitry printed on the continuous core sheet of the spine 221. Thus, all modules are coupled to the control circuitry 160 through corresponding connections 223 and each module becomes independently functional when the corresponding switch element 127 contained in its circuit board layer 112 is triggered by the opening of the book at the corresponding place. Of course, as explained above, when that happens the electronic circuitry 160 first activates the circuitry on the left (even) page and then that on the right (odd) page. FIG. 11 shows a perspective view of an embodiment 200 of the invention manufactured according to the spine and modular leaf approach just described.

One of the advantages of this modular approach is that each pair of pages O and E on the opposite sides of each leaf can be designed independently of the rest of the book, the only constraint being in the points of connection 223 through the spine 221. In addition, if the same visual display configuration is used for all pages in the book, the modular approach makes it possible to use the same core sheet (116 for example) for the entire book, identical in all respects except for one identifying connection 113, laminated with different printed material for different pages, thus greatly decreasing the cost of printing individual circuit board layers for each page. By comparison, the versatility of the accordion approach of the first embodiment is limited by the requirement that all electrical paths for the entire set of pages be cumulatively run through the continuous core sheet to the last page for connection with the terminal board 188. This means that the complexity of each individual page is necessarily reflected in progressively crowded circuitry toward the last page, where it all converges for connection with the terminal board. Therefore, the complexity of the circuitry on each page is necessarily limited by corresponding physical space requirements. Moreover, the accordion approach requires that any modification to the circuit board layer 186 be reflected in a manufacturing change to the entire continuous core sheet 180, instead of only one core sheet 116, with obvious cost and versatility drawbacks.

Figure 12:
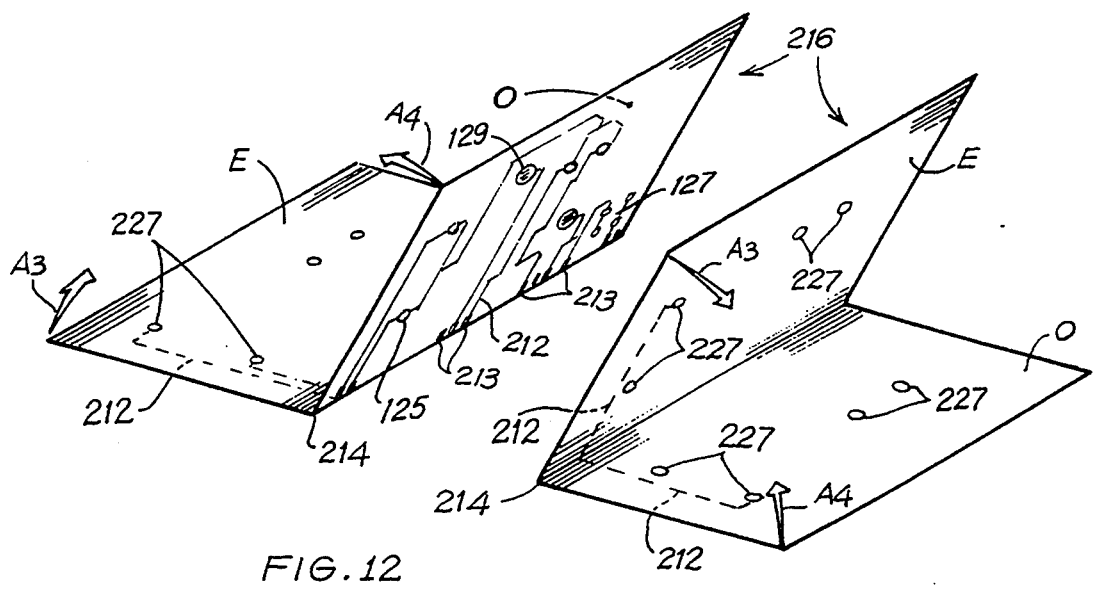
FIG. 12 is a perspective view of another kind of core sheet used to form adjacent modular book spreads, each corresponding to two facing pages, of the electronic book according to yet another embodiment of the invention.
Figure 13:
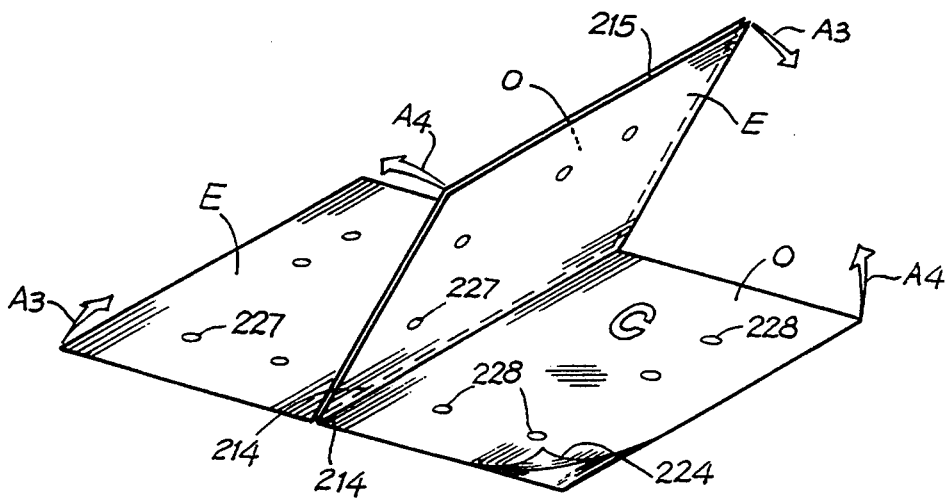
FIG. 13 is a perspective view of the modular core sheets of FIG. 12 after assembly into a book leaf and two corresponding book spreads.

In a fourth embodiment of the invention illustrated in FIG. 12, when the modular approach is used with the circuit board layer printed on the back side of the core sheet for each page, each spread (instead of leaf) of the book consists of one core sheet 216 corresponding to two facing pages on adjacent leaves, again referred to in the figure as E and O for even and odd with reference to conventional page numbering. Thus, by combining each pair of core sheet modules 216 so that the back sides of opposite pages come together and sandwich their respective portions of the circuit board layer 212, a leaf 215 is formed, as illustrated in FIG. 13. Of course, perforations 227 corresponding to each LED on the sandwiched back side of each page must be provided for visibility. As shown in the right hand page of FIG. 13, a top sheet 224 bearing printed matter and light apertures 228 (or corresponding translucent portions) is then affixed to each page to complete the laminated assembly.

In this configuration of the modular approach, each modular core sheet 216 (a spread of the book) bears a circuit board layer 212 corresponding to the specific display requirements of the corresponding pages, again with the same general characteristics described above for the continuous core sheet 180 of FIG. 4. By folding each core sheet 216 in two forward, in the direction of arrows A3 and A4 and along a center fold 214, as seen in FIG. 12, and by joining adjacent modules, as shown in FIG. 13, book leaves 215 are formed wherein the center folds 214 constitute the inside margins of each facing page E and O, and wherein the back of each page contains the half of the circuit board layer 212 that pertains to the printed material of its opposite page. Thus, each half of the circuit board layer printed on the back of each spread is connected to the other half by connections 213 along the fold corresponding to the outside edge of each center fold 214. For example, as shown in FIG. 12, the circuitry on the back of the odd page O on the left module in the figure corresponds to the printed material on the front of the even page E of the right module; similarly, the circuitry (not seen in the figure) on the back of the even page E on the right module necessarily corresponds to the printed material (also not seen) on the front of the odd page O of the left module. Since this configuration causes portions of the circuit board layers on adjacent core sheets to be in direct contact with one another because sandwiched between segments of adjacent spreads to form book leaves, it may also be necessary to protect the circuit board layers by coating them with a layer of flexible dielectric paint, such as the Olin Hunt "37AC22 UV Curable Spacer" product mentioned above, or equivalent insulating material.

Figure 14:
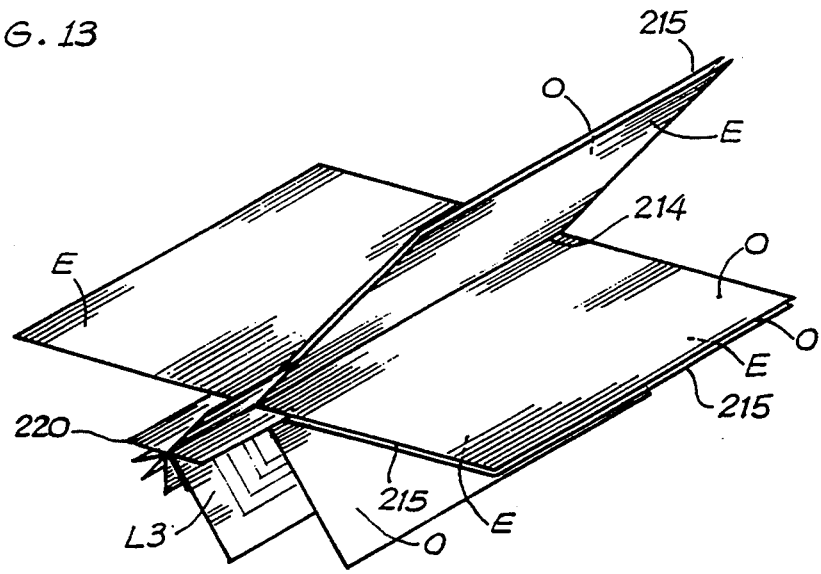
FIG. 14 is a perspective view of a fan-like spine for receiving each modular book spread while being combined to form book leaves, as shown in FIG. 8, between flaps that contain corresponding connections to the control circuitry of the book, wherein the spine is partially extracted for illustration.

In a manner equivalent to the method described above, by properly positioning the connections 213 of each circuit board layer 212 to overlap corresponding connections 223 (see FIG. 10), each core sheet 216 can be plugged in modular form into a matching spine 220 (seen in FIG. 14) equivalent to the spine 221 of FIG. 10. Of course, though, as shown in FIG. 14 where the spine 220 is only partially enmeshed with several core modules for illustration purposes, each module received between sets of flaps consists of one spread of facing pages, rather than one leaf of opposite pages. The spine of the book remains the point of connection for each page and each connection 223 in the spine is tied to a conductive path that is routed through the last segment L3 of the spine to the terminal board 188 (not seen in FIG. 14), which is in turn coupled to the intelligent electronic circuitry 160 housed in the head portion 150 of the book's cover.

As for the modular leaf approach of the third embodiment, the advantages of this modular approach include the fact that each pair of pages E and O on facing sides of each spread can be designed independently of the rest of the book, the only constraint being in the points of connection through the spine. In addition, if the same circuit-board-layer layout is used for all spreads in the book, the modular approach makes it possible to use the same core sheet 216 for the entire book, with a single different connection 213 in each circuit board layer for identification purposes, laminated with different printed material for different pages, thus again greatly decreasing the cost of printing individual circuit board layers.

Figure 15:
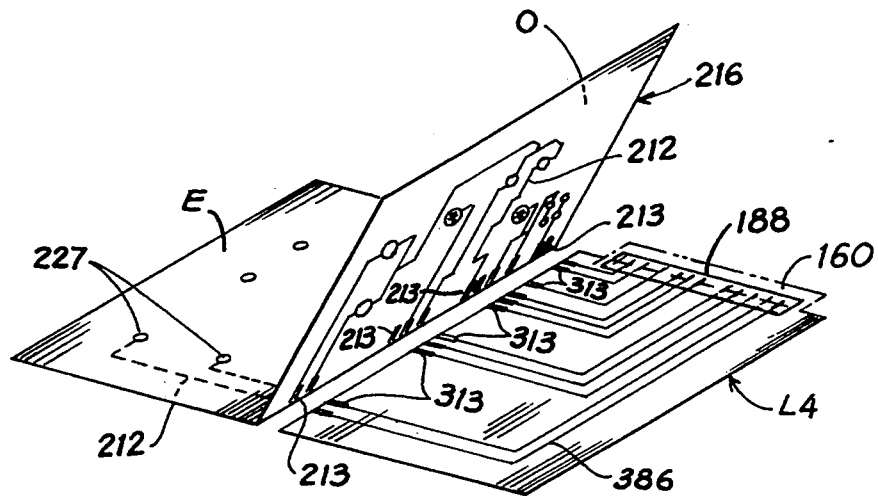
FIG. 15 is an illustration of the electrical paths used to route the circuitry of the book of FIG. 12 through the last book-spread module to the terminal board of the invention.

In yet another, fifth, embodiment of the invention, the accordion-type spine illustrated above as 220 (or 221) may be physically eliminated from the structure of the book, if the connections 213 (or 113) in adjacent modules overlap one another, because the abutting connections 213 (or 113) provide sufficient electrical contact, when bound together, to form the required electrical paths to the last segment of the circuit (illustrated in the figures as L3 and L2 for the two embodiments, respectively). Thus, as seen in FIG. 15, the spine assemblies 220 and 221 may be functionally replaced by a single-sheet last segment L4 containing electrical paths 386 that couple each connection 213 (or 113) on the last module 216 (or 116) with the terminal board 188. FIG. 15 illustrates the coupling between electrical connections 213 in a modular spread 216 and corresponding connections 313 in the last segment L4, wherein the connections are shown slightly apart for clarity. Of course, every other connection 213 (or 113) in the adjacent modules becomes also connected to the terminal board 188 by virtue of the contact between abutting connections 213 (or 113). That is, all modules become connected in parallel to the electronic circuitry 160. Note that the single-sheet segment L4 could also be eliminated altogether by connecting the terminal board 188, or any equivalent terminal layout used for coupling the modules with the intelligent electronic circuitry 160, directly to the connections 213 (or 113) in the spine of the book.

In order to improve the contact between abutting connections 213 (or 113) in this fifth embodiment of the invention, it is found that the use of anisotropic conductive material may be useful in the construction of the book of the invention. This material, also referred to in the industry as a z-axis conductive membrane, is characterized by its directional electric conductivity across its thickness (the z axis) and by its otherwise insulating characteristics in any other direction. It is available in tape form, such as the Scotch Brand 9703 Conductive Adhesive Transfer Tape sold by the 3M Company of St. Paul, Minn.; or in liquid form, as the Anisotropic Heat-Seal Coating 41DJB130 sold by the Olin Hunt company of Ontario, Calif. In either form, the anisotropic conductive material is laid on the circuit board layer 212 (or 112) to cover the connections 213 (or 113), and it is sandwiched between the modules to provide electrical contact between each pair of abutting connections without causing electrical shorting with the adjacent circuitry. Some of these products (e.g., the Scotch transfer tape) are placed on the circuit board layer as tape, which is cut to cover the desired portions of the board. Others (e.g., the Olin Hunt coating) are spread as a thin layer of paint or glue (0.5 to 1.5 mils in thickness), and are then heated to cure into a membrane with the required anisotropic characteristics. In any event, with or without the aid of anisotropic conductive material, the book of the invention can be bound according to conventional book binding procedures, requiring an adhesive (such as one of the polyurethane glues normally used in book-binding) to form a spine holding the modular leaves or spreads together.

It has also been found that variations of the book may employ thermochromic print in lieu of some of the light emitting diodes used in the display of the invention. Thermochromic printing is a well known technique and it is accomplished by screen printing a layer of thermochromic paint or ink and then superimposing a layer of conductive material, such as screen printable carbon, between two conductive leads on a support foundation. When electric current is passed through the conductive material from the leads to which it is connected, the heat generated by the current causes the thermochromic paint to change color, normally from an unobtrusive grey to a bright color of choice. Thus, this technique is particularly suitable to supplement or replace the use of LED's for this invention. Just as detailed above and illustrated in FIG. 6 for LED's, the two layers of thermochromic paint and conductive material can be laid across each set of terminals in the circuit board layer 186 to form a thermochromic element. Screen printable thermochromic paint is available in various colors from the Murfin Division of the Menasha Corporation of Neeha, Wisc.; and screen printable carbon is available from Olin Hunt under the name "Advanced Thermoset Polymer Thick Film IL-1 Graphite Conductor."

Thermochromic inks are normally offered in two formats. In one format the ink changes color when heated above a certain temperature and returns to its original color when cooled down. In the other format the ink is transformed into an almost transparent state by heat and returns to the original color when cooled down. The cycle can be repeated each time as the temperature is increased or decreased and is the same for both color-to-color and color-to-colorless options. There are several different types of thermochromic inks (12 offered by Menasha) with threshold temperatures ranging from −3° C. to 58° C. Similarly, original and changed colors can be specified within a wide range of colors, including colorless among the latter, which can be used to expose a printed design underneath the original color. Finally, thermochromic inks can be printed on most ordinary printable surfaces.

Another application that is ideal for this invention is the use of electro-illuminating ink, which can be laid between terminals in the circuit board layer of the invention in the same way that has been detailed for LED's and thermochromic print. This ink is conductive, like the ink used to form the circuit board layer 186, but it becomes luminous when current flows through it. Therefore, it affords an easy tool for illuminating the printed matter in the book with a variety of glowing colors. Electro-illuminating ink is available in different colors, for example, from the Murfin Division of the Menasha Corporation.

It should be noted that the modular approach illustrated in FIGS. 12–15 is suitable for using a single source of visual enhancement (whether LED, thermochromic element, or electro-illuminating ink site) for two opposite pages. By sandwiching the visual enhancement source between two perforations 227 on opposite pages and connecting it to the circuitry of both pages, the same source becomes available for the function of the circuit board layer for each page. A lens of the type formed with the non-conductive epoxy resin 196 shown in FIG. 6 should be used on both sides of the visual enhancing source to protect it from damage through the perforations 227. In the case of thermochromic elements, two different paints can be used around a single conductive strand of carbon to produce different colors on each side. Obviously, any combination of LED's, electro-illuminating ink, and thermochromic elements can be used throughout the circuit board layer of the invention without affecting any of the features described in this specification.

Figure 16:
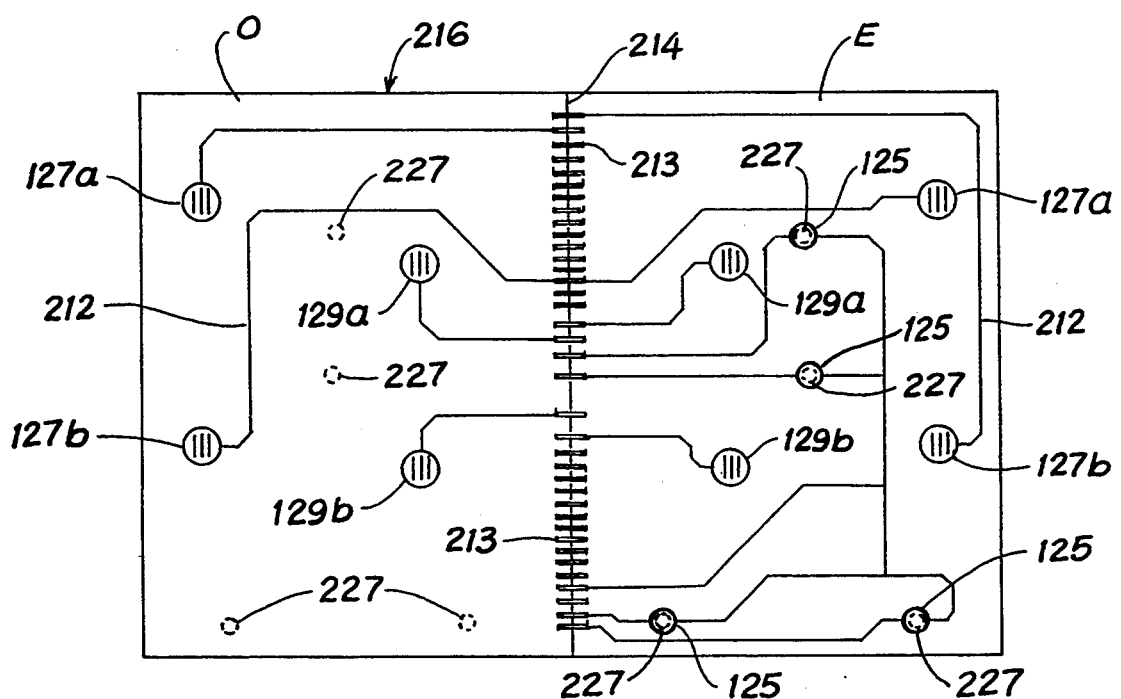
FIG. 16 illustrates the exact layout of the circuit board layer of the preferred embodiment of the core sheet shown in FIG. 12.

It should also be noted that, as indicated above, the switch elements 127 that automatically initiate the visual and audio display sequence when the book is opened at a given page may be replaced by manually operated switches, such as pressure switches 129 incorporated in the circuit board layer 112 or 212 of the page, to be activated by a user at will. FIG. 16 illustrates the exact layout of a circuit board layer 212 (i.e., used in the modular configuration described in the fourth and fifth embodiments) that is preferred at this time. In this preferred embodiment the switch elements 127a and 127b for each page consist of a conductive pad that is designed to abut a corresponding pad in the circuit board layer of the opposite page on the same leaf, the two pads being separated by a pressure sensitive dialectric medium, such as the Olin Hunt 37AC22 UV Curable Spacer product mentioned above. The dialectric is laid in grid form between conductive surfaces. Depending on the denseness of the grid, the conductive surfaces can be forced to come into contact through the dialectric grid by pressing against it. By choosing the appropriate grid, the dialectric medium thus becomes conductive (or, more precisely, its insulating function is bypassed) when a certain level of pressure is exerted upon it, thus connecting the two pads and activating the switch formed by them. For the purposes of this invention, it is recommended that the dialectric be screened over the printed circuit board layer in a grid that becomes conductive under approximately 7 ounces per square inch of pressure. Thus, the two switches formed by the switch element pairs 127a and 127b are utilized as pressure switches to activate the odd and even page, respectively, of the leaf. The pressure switches 129 for interactive sequences controlled by the viewer are also implemented by pressure switch elements 129a and 129b incorporated into each half of the circuit board layer. Thus, by combining adjacent modules in the manner shown in FIGS. 12 and 13, the circuit board layer 212 of FIG. 16 forms switches 127 and 129 sandwiched in each leaf 215 that are used to interact with the electronic control circuitry 160 to activate and control the progression of the various display functions programmed for each page on that leaf.

Figure 17:
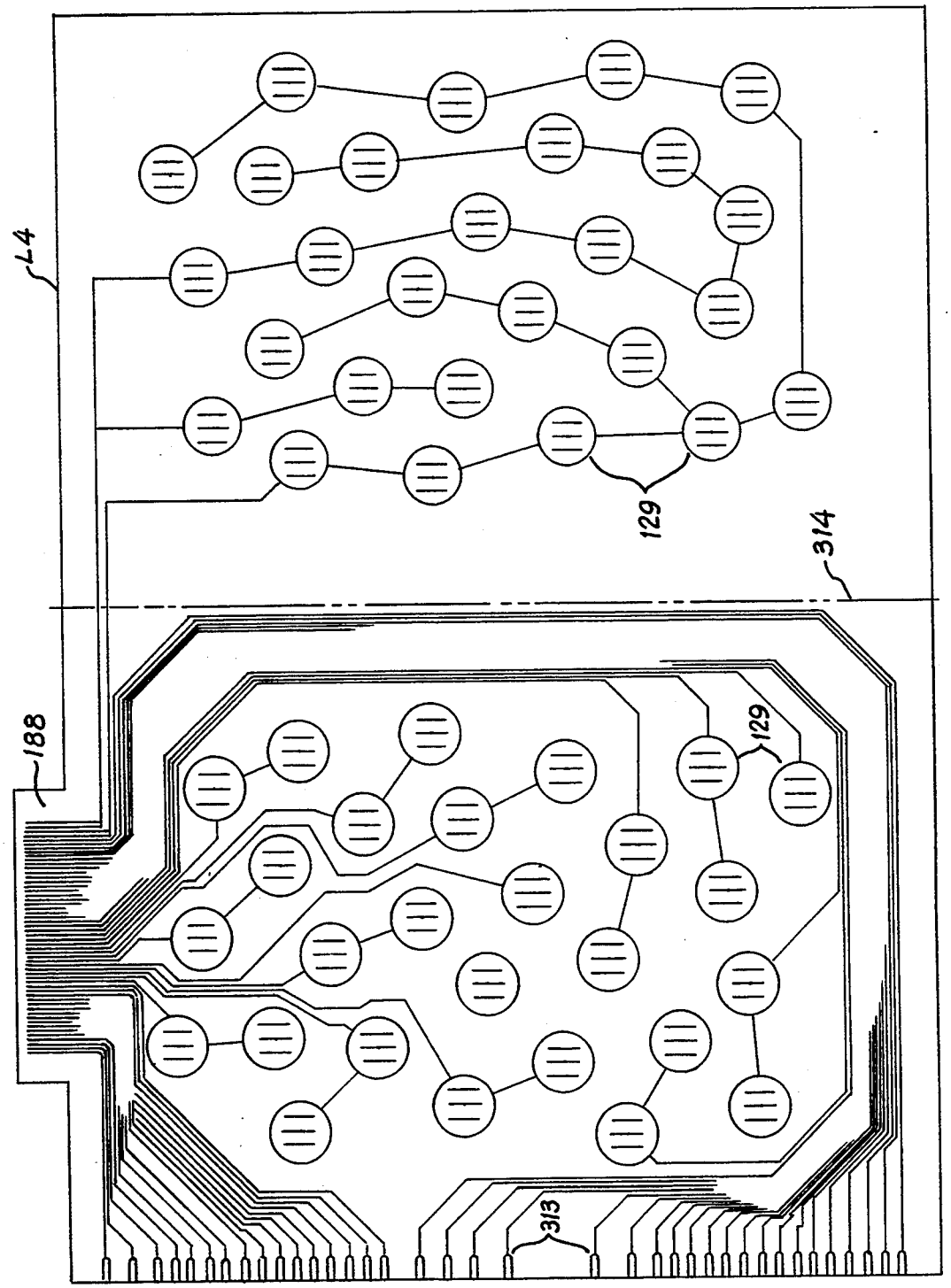
FIG. 17 shows the exact layout of the circuit board layer of the single-sheet last segment in the preferred embodiment of the invention, featuring the same set of connections of the circuit board layer of FIG. 16.

In the preferred embodiment, the LED's 125 (or, equivalently, any of the other visual signal means discussed above) are mounted on one half only of the circuit board layer and each LED is used for both of the opposite pages of the leaf within which it is sandwiched. Perforations or translucent portions 227 on both sides of the LED make it visible to both pages. Thus, the same general layout shown in FIG. 16 is used for all modules of the preferred embodiment of the invention, the only variation from module to module consisting in one different connection 213 for coupling with a matching individual connection 313 in the last segment L4 and, therefore, with a different terminal in the intelligent electronic circuitry 160 (so that each module is connected and can be activated independently). Using the binding technique described for the fifth embodiment (without a fan-like spine), each of the free connections 213 in each module (in the drawing of FIG. 16 for example, 25 connections are shown as free, i.e., not connected to the circuit board layer 212) serves as a bridge, through abutting connections in all adjacent modules, to a corresponding connection in a module where it is used as a path connecting the circuit board layer of that particular module to the terminal board. Thus, all modules feature the exact same set of connections 213, but each module uses one different connection for coupling with the intelligent circuitry. FIG. 17 shows the exact layout of the last segment L4 in the preferred embodiment of the invention, featuring the same set of connections 213 for coupling with the modules 216 in the manner shown in FIG. 15. Multiple pressure switch elements 129 are also added to the circuitry. By covering all the switch elements 129 with the pressure-sensitive dialectric medium described above and by folding the segment L4 along a center fold 314, matching pairs of switch elements 129 form manually actuated pressure switches that give the viewer game options to enhance the recognition of printed material superimposed on each switch. For example, pressing the letter B placed over one switch may initiate a repetition of the audio display used before in the book to illustrate the letter B in conjunction with the picture of a bear, and so on.

While the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus.

I claim:

1. An electronic book for identifying and highlighting printed information by visual signals in a sequentially organized manner, comprising:
   (a) a multiplicity of modular core sheets, each bearing a circuit board layer printed by means of flexible conductive ink and having electrical connections positioned in overlapping relationship with corresponding electrical connections in adjacent modular core sheets;
   (b) printed information sheets laminated onto said modular core sheets for communicating visual information to a user;
   (c) a multiplicity of visual signal means incorporated into said circuit board layer and visible to a user through said printed information sheets;
   (d) a power source;
   (e) sequence control means, coupled to said visual signal means, for sequentially energizing said visual signal means to highlight said printed information being viewed by the user according to a predetermined sequence;
   (f) switching means in said circuit board layer electrically connected to said power source and said sequence control means for activating said sequence control means to highlight and describe the printed information being viewed by the user; and
   (g) means for binding said multiplicity of modular core sheets into multi-leaf book format;
   wherein said multiplicity of modular core sheets is assembled into book format by joining all modular core sheets so that said electrical connections positioned in overlapping relationship with corresponding electrical connections in adjacent modular core sheets come together to form a book spine; and
   wherein said electrical connections electrically coupled to corresponding electrical connections in said adjacent core sheets in the book spine form continuous electrical paths to terminals connected to said power source, sequence control means and synchronization control means.

2. An electronic book for identifying and describing printed information by audio signals in a sequentially organized manner, comprising:
   (a) a multiplicity of modular core sheets, each bearing a circuit board layer printed by means of flexible conductive ink and having electrical connections positioned in overlapping relationship with corresponding electrical connections in adjacent modular core sheets;
   (b) printed information sheets laminated onto said modular core sheets for communicating visual information to a user;
   (c) a power source;
   (d) voice synthesizer means containing audio information corresponding to said printed information;
   (e) audio signal means coupled to said voice synthesizer means for communicating said audio information to the user, said audio signal means being responsive to a drive signal from said voice synthesizer means;
   (f) sequence control means, coupled to said voice synthesizer means, for sequentially activating said voice synthesizer means to identify and describe said printed information being viewed by the user according to a predetermined sequence;
   (g) switching means in said circuit board layer electrically connected to said power source and said sequence control means for activating said sequence control means to identify and describe the printed information being viewed by the user; and
   (h) means for binding said multiplicity of modular core sheets into multi-leaf book format;
   wherein said multiplicity of modular core sheets is assembled into book format by joining all modular core sheets so that said electrical connections positioned in overlapping relationship with corresponding electrical connections in adjacent modular core sheets come together to form a book spine; and
   wherein said electrical connections electrically coupled to corresponding electrical connections in said adjacent core sheets in the book spine form continuous electrical paths to terminals connected to said power source, sequence control means and synchronization control means.

3. An electronic book for identifying and highlighting printed information by visual signals in a sequentially organized manner and for further identifying and describing such printed information by synchronized audio signals, comprising:
   (a) a multiplicity of modular core sheets, each bearing a circuit board layer printed by means of flexible conductive ink and having electrical connections positioned in overlapping relationship with corresponding electrical connections in adjacent modular core sheets;
   (b) printed information sheets laminated onto said modular core sheets for communicating visual information to a user;
   (c) a multiplicity of visual signal means incorporated into said circuit board layer and visible to a user through said printed information sheets;
   (d) a power source;
   (e) voice synthesizer means containing audio information corresponding to said printed information;
   (f) audio signal means coupled to said voice synthesizer means for communicating said audio information to the user, said audio signal means being responsive to a drive signal from said voice synthesizer means;

(g) sequence control means, coupled to said visual signal means and to said voice synthesizer means, for sequentially energizing said visual signal means to highlight said printed information being viewed by the user and for activating said voice synthesizer means to describe said printed information according to a predetermined sequence;

(h) synchronization control means, coupled to said visual signal means, said voice synthesizer means and said sequence control means, for synchronizing the operation of said sequence control means so that the energizing of said visual signal means and the activation of said voice synthesizer means are synchronized according to a predetermined schedule of delivery;

(i) switching means in said circuit board layer electrically connected to said power source, said sequence control means and said synchronization control means for activating said sequence and synchronization control means to highlight and describe the printed information being viewed by the user; and (j) means for binding said multiplicity of modular core sheets into multi-leaf book format;

wherein said multiplicity of modular core sheets is assembled into book format by joining all modular core sheets so that said electrical connections positioned in overlapping relationship with corresponding electrical connections in adjacent modular core sheets come together to form a book spine; and wherein said electrical connections electrically coupled to corresponding electrical connections in said adjacent core sheets in the book spine form continuous electrical paths to terminals connected to said power source, sequence control means and synchronization control means.

4. The electronic book described in claim 3, wherein said multiplicity of modular core sheets consists of a multiplicity of book leaves assembled into book format, each leaf comprising one modular core sheet completely folded backwards to form two opposite book pages separated by a common edge at the fold; and wherein said circuit board layer is printed on the front side of each of said modular core sheets by means of flexible conductive ink and has electrical connections across the common edge between said two opposite pages, said electrical connections being positioned in overlapping relationship between adjacent modular core sheets.

5. The electronic book described in claim 3, wherein said multiplicity of modular core sheets consists of a multiplicity of book spreads assembled into book format, each spread comprising a modular core sheet folded forward to form two facing book pages separated by a common center fold; and wherein said circuit board layer is printed on the back side of each of said modular core sheets by means of flexible conductive ink and has electrical connections across the outside edge corresponding to the common center fold between said two facing pages, said electrical connections being positioned in overlapping relationship between adjacent modular core sheets.

6. The electronic book described in claim 3, wherein said multiplicity of modular core sheets is combined to form a single continuous core sheet folded in accordion fashion to form pairs of adjacent segments, wherein the inside folds of said continuous core sheet are bound to constitute the book's spine, while the outside folds constitute the outer edges of the book's pages; and wherein a single continuous circuit board layer is printed on one side of said continuous core sheet by means of flexible conductive ink.

7. The electronic book described in claim 6, wherein said continuous circuit board layer is printed on the front side of said continuous core sheet by means of flexible conductive ink.

8. The electronic book described in claim 6, wherein said continuous circuit board layer is printed on the back side of said continuous core sheet by means of flexible conductive ink, and wherein perforations are provided in said core sheet matching the sites of said multiplicity of visual signal means to make them visible from the front side.

9. The electronic book described in claim 1, 2, 3, 4, 5, 7 or 8, wherein each of said multiplicity of visual signal means incorporated into said modular circuit board layer and visible to a user through said printed information sheets is selected from the group consisting of light emitting diodes, thermochromic elements, and electro-illuminating ink.

10. The electronic book described in claim 9, wherein said visual signal means incorporated into said modular circuit board layer and visible to a user through said printed information sheets consists of light emitting diodes that are manufactured by bonding semiconductor die chips directly into said circuit board layer.

11. The electronic book described in claim 1, 2, 3, 4, 5, 7 or 8, wherein said printed information sheets laminated onto said modular core sheets for communicating visual information to a user feature apertures overlapping said multiplicity of visual signal means, thereby rendering said visual signal means visible to the user through said apertures.

12. The electronic book described in claim 11, wherein said apertures are replaced by translucent portions in said printed information sheets overlapping said multiplicity of visual signal means, thereby rendering said visual signal means visible to the user through said translucent portions.

13. The electronic book described in claim 1, 2, 3, 4, 5, 7 or 8, further comprising:

a multiplicity of pressure switches incorporated into said circuit board layer for connection with said sequence control means to provide the user with predetermined alternative progression options selected by applying pressure on recognizable features corresponding to said pressure switches in said printed information sheets.

14. The electronic book described in claim 1, 2, 3, 4, 5, 7 or 8, further comprising:

anisotropic conductive material laid on said circuit board layer to cover said electrical connections sandwiched between said modular core sheets to provide electrical contact between each pair of abutting connections in said spine.

15. The electronic book described in claim 1, 2, 3, 4, or 5, further comprising:

a fan-like spine having flexible conductive circuitry printed thereon for receiving said multiplicity of modular core sheets, each core sheet being sandwiched between corresponding flaps in said spine, wherein said electrical connections in each core sheet are coupled to corresponding electrical connections in said fan-like spine, and wherein the flexible conductive circuitry in said fan-like spine forms continuous electrical paths to said power source, sequence control means and synchronization control means.

16. The electronic book described in claim 1, 2, 3, 4, 5, 7 or 8, wherein said power source consists of a battery.

17. The electronic book described in claim 2, 3, 4, 5, 7 or 8, wherein said audio signal means coupled to said voice synthesizer means for communicating said audio information to a user consists of a speaker.

18. The electronic book described in claim 2, 3, 4, 5, 7 or 8, wherein said audio signal means coupled to said voice synthesizer means for communicating said audio information to a user consists of headphones.

19. The electronic book described in claim 1, 2, 3, 4, 5, 7 or 8, wherein said switching means for activating said sequence control means at a page being viewed by a user consists of an electromechanical switch that extends from said circuit board layer through said printed information sheet laminated onto said core sheet to initiate the operation of the electronic book when it is opened at that page.

20. The electronic book described in claim 1, 2, 3, 4, 5, 7 or 8, wherein said switching means for activating said sequence control means at a page being viewed by a user consists of a photo-sensitive switch that extends from said circuit board layer through said printed information sheet laminated onto said core sheet to initiate the operation of the electronic book when it is opened at that page.

21. A method for constructing an electronic book for identifying and highlighting printed information by visual signals in a sequentially organized manner and for further identifying and describing such printed information by synchronized audio signals, comprising the steps of:

(a) providing a multiplicity of modular core sheets;
  (b) printing a circuit board layer on each of said modular core sheets by means of flexible conductive ink, said circuit board layer having electrical connections positioned in overlapping relationship with corresponding electrical connections in adjacent modular core sheets;
  (c) laminating printed information sheets onto said modular core sheets for communicating visual information to a user;
  (d) incorporating a multiplicity of visual signal means into said circuit board layer printed on each modular core sheet, wherein said visual signal means are visible to a user through said printed information sheets;
  (e) providing a power source;
  (f) providing voice synthesizer means containing audio information corresponding to said printed information;
  (f) providing audio signal means coupled to said voice synthesizer means for communicating said audio information to the user, said audio signal means being responsive to a drive signal from said voice synthesizer means;
  (g) providing sequence control means, coupled to said visual signal means and to said voice synthesizer means, for sequentially energizing said visual signal means to highlight said printed information being viewed by the user and for activating said voice synthesizer means to describe said printed information according to a predetermined sequence;
  (h) providing synchronization control means, coupled to said visual signal means, said voice synthesizer means and said sequence control means, for synchronizing the operation of said sequence control means so that the energizing of said visual signal means and the activation of said voice synthesizer means are synchronized according to a predetermined schedule of delivery;
  (i) providing switching means in said circuit beard layer electrically connected to said power source, said sequence control means and said synchronization control means for activating said sequence and synchronization control means to highlight and describe the printed information being viewed by the user; and
  (j) binding said multiplicity of modular core sheets into multi-leaf book format;
  wherein said multiplicity of modular core sheets is assembled into book format by joining all modular core sheets so that said electrical connections positioned in overlapping relationship with corresponding electrical connections in adjacent modular core sheets come together to form a book spine; and
  wherein said electrical connections electrically coupled to corresponding electrical connections in said adjacent core sheets in the book spine form continuous electrical paths to said power source, sequence control means and synchronization control means.

22. The method described in claim 21, wherein said multiplicity of modular core sheets consists of a multiplicity of book leaves assembled into book format, each leaf comprising one modular core sheet completely folded backwards to form two opposite book pages separated by a common edge at the fold; and wherein said circuit board layer is printed on the front side of each of said modular core sheets by means of flexible conductive ink and has electrical connections across the common edge between said two opposite pages, said electrical connections being positioned in overlapping relationship between adjacent modular core sheets.

23. The method described in claim 21, wherein said multiplicity of modular core sheets consists of a multiplicity of book spreads assembled into book format, each spread comprising a modular core sheet folded forward to form two facing book pages separated by a common center fold; and wherein said circuit board layer is printed on the back side of each of said modular core sheets by means of flexible conductive ink and has electrical connections across the outside edge corresponding to the common center fold between said two facing pages, said electrical connections being positioned in overlapping relationship between adjacent modular core sheets.

24. The method described in claim 21, wherein said multiplicity of modular core sheets is combined to form a single continuous core sheet folded in accordion fashion to form pairs of adjacent segments, wherein the inside folds of said continuous core sheet are bound to constitute the book's spine, while the outside folds constitute the outer edges of the book's pages; and wherein a single continuous circuit board layer is printed on one side of said continuous core sheet by means of flexible conductive ink.

25. The method described in claim 24, wherein said continuous circuit board layer is printed on the front side of said continuous core sheet by means of flexible conductive ink.

26. The method described in claim 24, wherein said continuous circuit board layer is printed on the back side of said continuous core sheet by means of flexible conductive ink and
   wherein perforations are provided in said core sheet matching the sites of said multiplicity of visual signal means to make them visible from the front side.

27. The method described in claim 21, 22, 23, 25 or 26, wherein each of said multiplicity of visual signal means incorporated into said modular circuit board layer and visible to a user through said printed information sheets is selected from the group consisting of light emitting diodes, thermochromic elements, and electro-illuminating ink.

28. The method described in claim 27, wherein said visual signal means incorporated into said modular circuit board layer and visible to a user through said printed information sheets consists of light emitting diodes that are manufactured by bonding semiconductor die chips directly into said circuit board layer.

29. The method described in claim 21, 22, 23, 25 or 26, further comprising the step of providing apertures in said printed information sheets laminated onto said modular core sheets for communicating visual information to a user, wherein said apertures overlap said multiplicity of visual signal means, thereby rendering said visual signal means visible to the user through said apertures.

30. The method described in claim 21, 22, 23, 25 or 26, further comprising the step of providing translucent portions in said printed information sheets laminated onto said modular core sheets for communicating visual information to a user, wherein said translucent portions overlap said multiplicity of visual signal means, thereby rendering said visual signal means visible to the user through said translucent portions.

31. The method described in claim 21, 22, 23, 25 or 26, further comprising the step of providing a multiplicity of pressure switches incorporated into said circuit board layer for connection with said sequence control means to provide the user with predetermined alternative progression options selected by applying pressure on recognizable features corresponding to said pressure switches in said printed information sheets.

32. The method described in claim 21, 22, 23, 25 or 26, further comprising the steps of applying anisotropic conductive material on said circuit board layer to cover said electrical connections, and sandwiching said anisotropic conductive material between said modular core sheets to provide electrical contact between each pair of abutting connections in said spine.

33. The method described in claim 21, 22, or 23, further comprising the steps of providing a fan-like spine having flexible conductive circuitry printed thereon for receiving said multiplicity of modular core sheets, and of sandwiching each core sheet between corresponding flaps in said spine, whereby said electrical connections in each core sheet become coupled to corresponding electrical connections in said fan-like spine, and whereby the flexible conductive circuitry in said fan-like spine forms continuous electrical paths to said power source, sequence control means and synchronization control means.

34. The method described in claim 21, 22, 23, 25 or 26, wherein said power source consists of a battery.

35. The method described in claim 21, 22, 23, 25 or 26, wherein said audio signal means coupled to said voice synthesizer means for communicating said audio information to a user consists of a speaker.

36. The method described in claim 21, 22, 23, 25 or 26, wherein said audio signal means coupled to said voice synthesizer means for communicating said audio information to a user consists of headphones.

37. The method described in claim 21, 22, 23, 25 or 26, wherein said switching means for activating said sequence control means at a page being viewed by a user consists of an electromechanical switch that extends from said circuit board layer through said printed information sheet laminated onto said core sheet to initiate the operation of the electronic book when it is opened at that page.

38. The method described in claim 21, 22, 23, 25 or 26, wherein said switching means for activating said sequence control means at a page being viewed by a user consists of a photo-sensitive switch that extends from said circuit board layer through said printed information sheet laminated onto said core sheet to initiate the operation of the electronic book when it is opened at that page.

* * * * *